Aug. 1, 1961 — E. SCHASCHL — 2,994,219
CORROSION TEST PROBE
Filed Nov. 15, 1957 — 3 Sheets-Sheet 1

INVENTOR.
EDWARD SCHASCHL
BY Edward H. Lang
ATTORNEY

Aug. 1, 1961 E. SCHASCHL 2,994,219
CORROSION TEST PROBE
Filed Nov. 15, 1957 3 Sheets-Sheet 2

INVENTOR.
EDWARD SCHASCHL
BY Edward H. Lang
ATTORNEY

Aug. 1, 1961  E. SCHASCHL  2,994,219
CORROSION TEST PROBE

Filed Nov. 15, 1957  3 Sheets-Sheet 3

INVENTOR.
BY  EDWARD SCHASCHL
*Edward K. Jung*
ATTORNEY

United States Patent Office 2,994,219
Patented Aug. 1, 1961

2,994,219
CORROSION TEST PROBE
Edward Schaschl, Crystal Lake, Ill., assignor to The Pure Oil Company, Chicago, Ill., a corporation of Ohio
Filed Nov. 15, 1957, Ser. No. 696,682
10 Claims. (Cl. 73—86)

This invention relates to a corrosion-test probe having, in combination, means for exposing a corrodible test element or specimen to a corrosive atmosphere and means for simultaneously measuring the temperature of said corrosive atmosphere. This invention, more particularly, relates to a corrosion-testing probe which is adapted to be inserted into or removed from a vessel or pipe containing the corrosive atmosphere under pressure and which incorporates as a part of its electrical circuit a thermocouple in combination therewith. The invention also relates to a corrosion-testing probe having a built-in thermocouple wherein the common lead of the corrosion-test probe portion of the circuit doubles as one part of a thermocouple and an extra lead of a dissimilar metal, such as Constantan, is connected at an intermediate point in the common lead to form the hot juncture and generator of the thermocurrent.

Corrosion-test probes which are temperature-compensating have been disclosed in certain previous patent applications by the present inventor and others. These devices take advantage of the methods that have been devised which make use of the correlation between change in electrical conductivity and change in cross-sectional area to determine the rate of corrosion of various materials of construction, through the use of corrosion-test probes mounted on various base elements and connected to electrical resistance-change meters. The basic problem with which this invention is concerned is that of determining accurately the actual temperature at which the corrosion tests are being made without unduly complicating the base elements, and without the necessity of unduly increasing the number of leads to be insulated and pressure-sealed by the base element. Copending applications Serial Nos. 528,032 and 604,205, and Patent Nos. 2,834,858, 2,851,570, 2,864,252, and 2,878,354 describe in detail corrosion-measuring circuits and test probes which may be modified for use in this invention.

It becomes, therefore, a primary object of this invention to provide a corrosion-test probe to be used with an electronic resistance-measuring apparatus adapted to determine the corrosivity of environments under conditions of relatively high temperature and high pressure and determine accurately the actual temperature at which these measurements are made.

Another object of this invention is to provide a new form of corrosion-test probe having a simplified thermocouple circuit as part of the common lead to the test specimens.

Still another object of the invention is to provide a corrosion-test probe having a thermocouple as a part of its circuit exposed to the corrosive atmosphere.

These and other objects of the invention will become apparent or be described as the invention is set forth in more detail.

The invention is best understood by reference to the attached drawings wherein.

Figure 1:
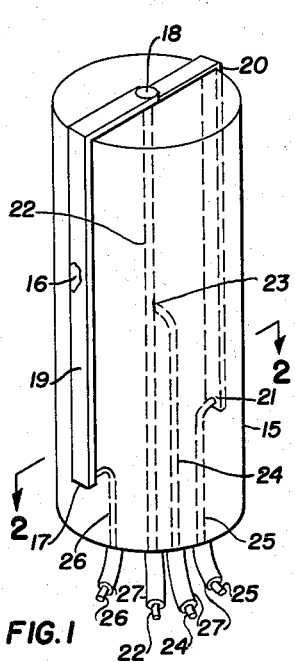
FIGURE 1 is an isometric projection of one type of probe, described in copending patent application Serial Number 568,906, now Patent No. 2,851,510, incorporating an internal thermocouple arrangement with the common lead of a probe comprising metal-strip test specimens on the surface of an insulating core.

For simplicity, in describing the invention in relation to the drawing, the part numbers have been changed from those used in the copending applications from which the test-probe portions of the device have been taken, and the added elements which constitute the present invention have been given numbers in sequence therewith as the continuity of the description proceeds, although in some instances the shape or structure of the added elements appear unchanged and would normally call for assignment of the same numbers as corresponding parts.

Figure 2:
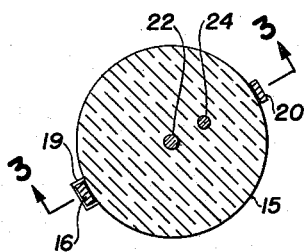
FIGURES 2 and 3 are cross-sectional views of the embodiment shown in FIGURE 1 along the section lines indicated.
Figure 3:
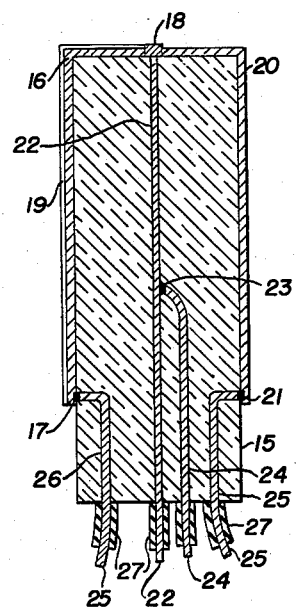

Referring to FIGURES 1, 2 and 3, the numeral 15 indicates the insulating body support of the test probe, which may be in the form of a cylinder made of porcelain, or synthetic plastics and other materials to be subsequently described. Attached to the outside of the insulated body is test element 16 which extends from contact 17 near the base upwardly along the outside and across the top to contact 18. Test element 16 is covered with a protective coating indicated at 19 along the entire length between contacts 17 and 18. Coating 19, described infra, may be any material resistant to the atmosphere under test. A second test element 20 extends in a similar manner from contact 18 across the top of insulating base 15 and down the opposite side of contact 21. Test element 20 is unprotected and is subjected to attack by the corrosive atmosphere into which the probe is inserted and held by means not indicated. At contact 18 test elements 16 and 20 form a common juncture with central lead 22. Attached at a second juncture 23 is a second lead 24. At each contact 17 and 21 a corresponding lead, as 25 and 26, is similarly situated. Each of these leads extends out the bottom of insulated body 15 and has its extended portion individually insulated as indicated at 27. Lead 22, juncture 23 and lead 24 constitute the thermocouple elements that have been incorporated in accordance with this invention.

As is well known in the temperature-measuring art, the construction shown forms a thermo-electric couple where the leads 22 and 24 are of dissimilar metals and juncture 23 becomes the hot end, while the cold end is represented by the extending ends of leads 22 and 24 at the bottom of the device. Leads 22 and 24 may be composed of various combinations of dissimilar metals to form a thermocouple such as iron-Constantan, copper-Constantan, Chromel - Constantan, platinum - rhodium, combinations of base metals, Chromel-Alumel, platinum-iridium, or other metal combinations known to this art. Thus lead 22 may be Constantan and lead 24 copper or iron. The measuring circuit, which does not form a part of this invention, is connected to the extended ends of leads 22 and 24 in a manner well known in the art. Means for compensating for errors due to temperature fluctuations may be incorporated as described by Blakeslee in United States Patent 1,441,207.

Figure 4:
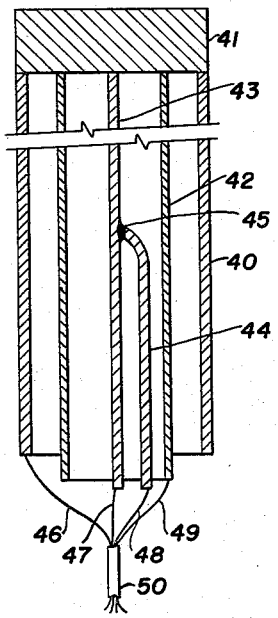
FIGURE 4 is a vertical cross-sectional view of the type of corrosion-test probe, described in copending patent application Serial No. 597,368, now Patent No. 2,878,354, having an internal thermocouple made a part of the common lead therein in accordance with the invention herein.
Figure 6:
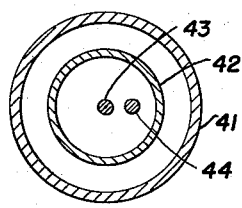
FIGURES 5 and 6 are additional views of the embodiment shown in FIGURE 4.
Figure 5:
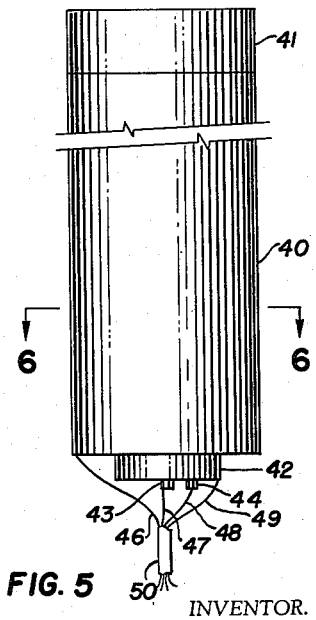

Referring to FIGURES 4, 5 and 6, the thermocouple arrangement of this invention is shown in combination with another form of corrosion test probe. In this probe, the exposed test specimen 40 is cylindrical or tubular in shape and is attached to end-plate or block member 41 by means of welding or other suitable means of attachment so that the corrosive atmosphere cannot enter therethrough. End-plate 41 is of sufficient thickness and size in relation to the thickness of the other parts of the probe as to introduce negligible resistance into the electrical system and offer practically no change in resistance due to the corrosion of its exposed surfaces. Test specimen 40 and block 41 function as an enclosure for protected test specimen 42 which is also tubular in cross-section and is attached to block 41. Lead 43 is located within test specimen 42 and constitutes also one member of the thermocouple. The second member of the bi-metallic thermocouple is represented by lead 44 attached to lead 43 at hot junction 45. End-plate 41 functions as a common junction for test specimens 40 and 42 along with lead 43. Electrical connection of the test probe, through the base member (not shown) adapted to hold same in pressure-sealed relationship through the wall of a process vessel containing the corrosive atmosphere, is made through auxiliary leads 46, 47, 48 and 49, forming insulated cable 50. As in the embodiment shown in FIGURES 1, 2 and 3, the test specimens are made of any metallic material of construction for which corrosion rate measurements are desired. The leads 43 and 44 may be various bi-metallic combinations known in the art to form a thermocouple. In each instance in FIGURES 1 through 5, so far described, the central leads 22 and 43 also function as a common lead to the corrosion-measuring circuit (not shown). Test elements 16 and 42 act as control resistances and compensate for temperature fluctuations.

Figure 7:
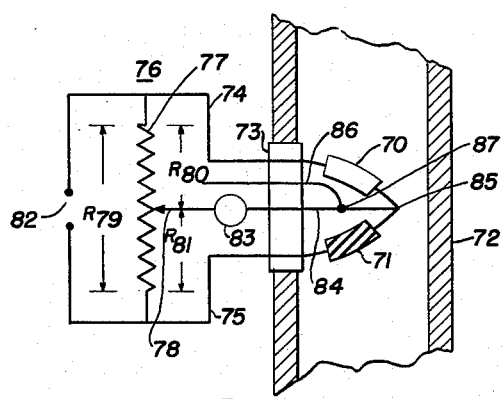
FIGURE 7 is a schematic arrangement showing one embodiment of copending patent application Serial Number 604,205, incorporating a thermocouple as a part of the common lead therein in accordance with this invention.

Referring to FIGURE 7, it is seen that test specimen 70 and protected specimen 71 are installed in an enclosed vessel 72 illustrative of an inaccessible location which does not conveniently permit weight-measurement corrosion testing to be carried out, in this instance a conduit, such as a pipe line. Test specimen 71 is indicated as being encased in protective coating. A suitable coating is an epoxy resin exemplified by Armstrong Adhesive A-2, marketed by the Armstrong Products Co., Warsaw, Indiana, which isolates specimen 71 from the corrosive environment to prevent its being corroded. These specimens, electrically connected in series, are mounted on a suitable base member 73 which is installed in the wall of conduit 72. This combination of elements, which is termed the corrosion-testing unit of the apparatus, or "probe," forms one resistance branch of an electrical bridge circuit. Low-resistance leads 74 and 75, which are respectively attached to the terminal extremities of this series arrangement, are interconnected to the other resistance branch of the bridge circuit 76. In the illustrative embodiment, potentiometer 77 is employed to provide the other cooperating resistance element of a conventional electrical bridge circuit, resistance-measuring apparatus. The potentiometer employs sliding contact 78 which divides total resistance R79 into resistances R80 and R81 to balance the resistances against test specimens 70 and 71. The separate circuits formed by specimens 70 and 71 are installed within the vessel and resistances R80 and R81 are connected in parallel therewith, and a suitable power source 82, either A.C. or D.C., is used to energize the circuit thus formed. A suitable, sensitive, current-measuring meter, such as galvanometer 83, is installed between the resistance circuits interconnecting the intermediate points of the respective resistance circuits by means of common lead 84. Common lead 84 connects to juncture 85 and also to lead 86 through juncture 87 to form the thermocouple arrangement of this invention.

Figure 8:
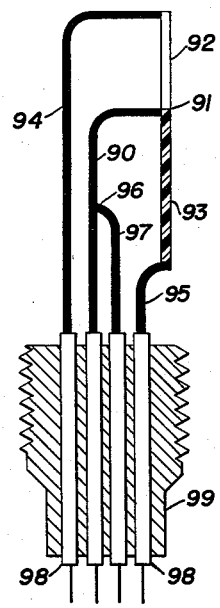
FIGURE 8 is a partial cross-sectional view of one form of specimen holder, described in copending patent application Serial Number 604,205, incorporating a thermocouple as a part of the common lead therein in accordance with the present invention.

Still another arrangement is shown in FIGURE 8 wherein the thermocouple lead element 90 connects from common juncture 91 of test elements 92 and 93 (protected), which also have leads 94 and 95. A thermocouple is formed at juncture 96 of lead elements 90 and 97, and all of said leads pass through and are supported by insulators 98 in base 99.

Figure 9:
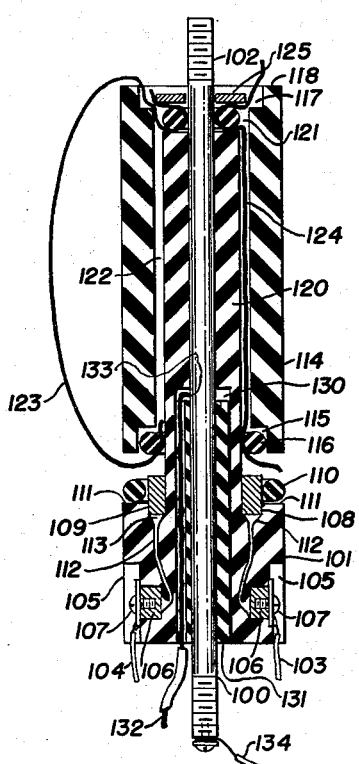
FIGURE 9 is a partially disassembled vertical cross-sectional view of one form of a specimen holder, described in copending application Serial Number 629,077, now Patent No. 2,834,858, showing the combination of parts with a thermocouple and lead assembly as part of the common lead therein in accordance with the present discovery.

In FIGURE 9 the parts are shown in an exploded view. Rod 100 extends through base 101 and terminates in threaded section 102. Leads 103 and 104 extend into recesses 105 and attach to contact members 106 by means of screws 107. Base 101 has half-rings 108 and 109 partially imbedded therein and forming a shoulder for O ring 110 in cooperation with shoulders 111 of base 101. Leads 112 connect between the respective O rings and contact members 106, same being soldered thereon as indicated at 113. Sleeve 114 has annular recess 115 engaging inner O ring 116, and the annular recess 117 forming shoulder 118 to engage O ring 119. Base member 101 has extended portion 120 which is sealed along part of its length to rod 100. O ring 121 encompasses rod 100 at the end of base 101. O rings 116 and 121 hold sleeve 114 in spaced relationship as indicated by annular space 122 from extended portion 120 of base 101. Exposed test specimen 123 has one terminus within space 122, passes through the center opening in ring 116, adjacent half-ring 109, and passes between the end of sleeve 114 and O ring 110. The other end passes between the end of sleeve 114 at shoulder 118 and O ring 119, and around and through O ring 121. A similar arrangement is shown for protected test element 124 except that the main body thereof is within annular space 122 and is thus protected from the corrosive atmosphere. Washer 125 encircles rod 100. Cap member 126 has inner insert or plug member 127 having threaded aperture 128. Plug member 127 extends beyond the edge of cap 126 to form an annular shoulder 129 for O ring 119.

To incorporate the thermocouple in this embodiment, base 101 is provided with a bore-hole 130 into which fits tubular insulator 131. Thermocouple lead 132 extends between insulator 131, within bore-hole 130 and against base 101, and connects with rod 100 at juncture 133. It is seen that when cap member 126 is secured down on threads 102 of rod 100, the half-rings 108 and 109 are forced against the test elements 123 and 124, and plug 127 is forced against washer 125 which in turn pressed against the turned ends of the test specimens, forcing same into contact with rod 100 to form their common juncture. Lead 134 and leads 103 and 104 and 132 are comparable to leads 22, 26, 25 and 24, respectively, of FIGURE 1 or leads 47, 49, 46 and 48, respectively, of FIGURE 4.

Figure 10:
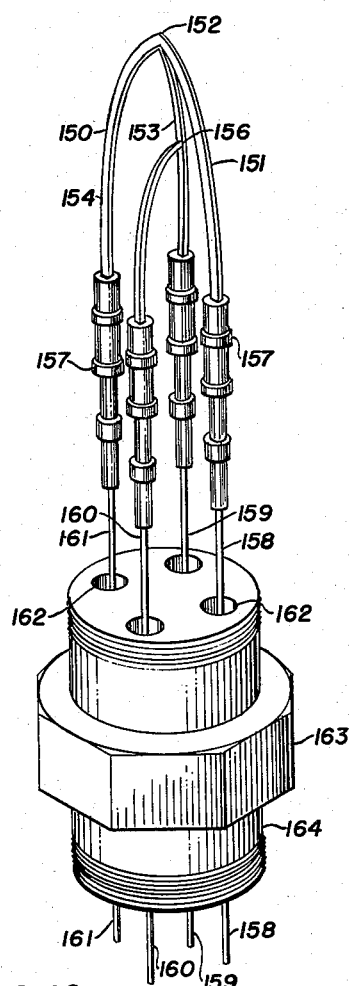
FIGURE 10 is an isometric projection showing the manner in which the common lead of the device of copending application Serial Number 629,365, now Patent No. 2,864,252, may be altered to contain the thermocouple circuit of this invention.
Figure 11:
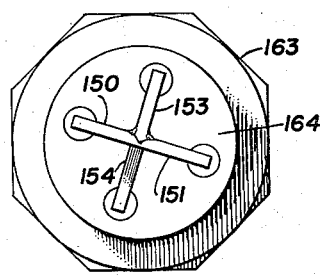
FIGURE 11 is an end view of the embodiment shown in FIGURE 10.

Referring to FIGURES 10 and 11, the number 150 represents the exposed test specimen or strip, and 151 the protected test specimen. Specimens 150 and 151 are joined at common point or juncture 152 from which center lead or tap 153 extends. Lead 154 attaches to lead 153 at juncture 156 to form the thermocouple. The test specimens and center tap are each held by means of insulating and pressure-sealed lugs as indicated at 157, and are electrically connected to leads 158, 159, 160 and 161, as indicated, which run through the entire assembly. The test specimens, center tap and leads may be soldered or welded to the corresponding ends of the lugs. Lugs 157 are identical, fit within bore-holes 162 in sealed relationship, and are held in place by collar 163 of base 164.

Figure 12:
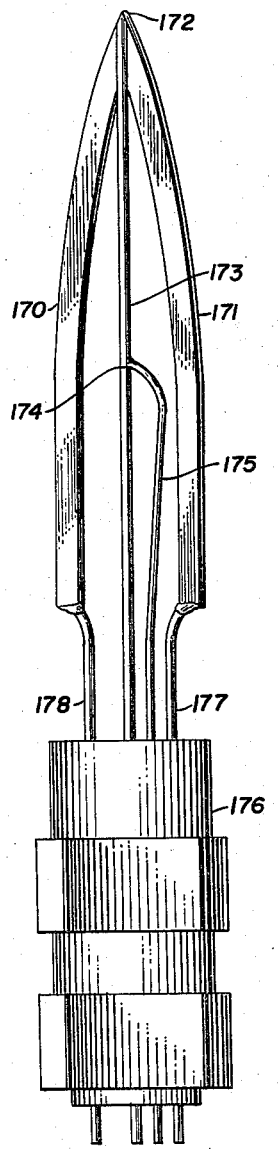
FIGURE 12 is a side view of still another embodiment showing the test specimen, and thermocouple arrangement attached to another type of base element.

In FIGURE 12 the test elements 170 and 171 (coated) join at common juncture 172 with common lead 173 which in turn forms thermocouple juncture 174 with lead 175, same being supported by base 176 through leads 177 and 178, the assembly being adapted to be inserted into and through a valved conduit communicating with a vessel whereby said test elements are brought into contact with the corrosive atmosphere under test.

From the foregoing description it is apparent that the invention is realized by changing the common leads 22, 43, 84, 90, 100, 153, and 173 in FIGURES 1, 4, 7, 8, 9, 10 and 12, respectively, to one of the types of metals used in temperature measurement and adding to the individual circuits of the test devices a fourth lead of a metal dissimilar to the common lead, thus forming a cold junction and a thermocouple. Thus leads 22, 43, 84, 90, 100, 153 and 173 may be iron or copper, while leads 24, 44, 86, 97, 132, 154 and 175 may be Constantan.

The types of metals or alloys used to form the thermocouple arrangements shown may be varied in accordance with known procedures to obtain the desired temperature response and sensitivity to correspond with the temperature conditions to be measured. One advantage arising from this invention is that the temperature measurements are made in the immediate environment of the corrosion measurements and simultaneously therewith using the same probe. Furthermore, since one of the main problems in this art is to provide an effective pressure seal between the electrical leads and the base member, this problem is not further complicated by the requirement of several additional leads and only requires one added lead.

The insulating and supporting core 15 of FIGURES 1, 2 and 3 may be fabricated from such materials as paper and fabric laminates used in printed circuitry, such as XX Phenolic, XXP Phenolic, XXX Phenolic, XXXP Phenolic and epoxy resin laminates where the maximum operating temperature of the test probe does not exceed about 250° F. These materials, described in Materials and Methods, vol. 42., No. 1, July 1955, exhibit good metal bonding strength, are relatively flexible without breaking, are arc resistant and of low cost. Test elements 16 and 20 are bonded to core 15 by applying the metal test strip thereto and applying heat at 400° to 450° F. for about 5 seconds. Glass fiber laminates, melamines, silicones, polystyrene, Teflon and epoxy resins have different bonding temperatures that may be applied to secure adhesion of the metal strip thereto. Ceramic materials such as titanite, steatite, glass-bonded mica and glass-bonded synthetic mica may also be used, same being able to withstand higher temperatures, i.e., 650° to 750° F. The test elements 16 and 20 are formed by printed circuitry techniques, including such techniques as etched wiring, painted wiring, plated wiring, embossed wiring, stamped wiring, pressed metal powder and sprayed metal processes.

The coatings for the protected test specimens 16, 71, 93, 151, 171 may be any non-conducting material which prevents the corrosive atmosphere from attacking the metal surface of the test specimen. Included are such proprietary compounds and compositions as Tygon paint, Armstrong A-2 adhesive, Carbolene, Phenoline 300, Scotchcast Resin-MMM, Sauereisen cement (for high temperature applications) Kel-F, Teflon, polyethylene and other fluorinated ethylene polymers. The coatings should be of sufficient thickness to provide protection and may be applied by spraying, dipping, brushing, etc.

The metal-to-metal joints between the test specimens and the various leads to form the contact points and common junctures referred to herein are formed by soldering, using the various special solders available to join the same, or different kinds of metals as is well known in the art. Ordinary solder, silver solder and the like may be used for this purpose.

Because of the particular construction of the test probe shown in FIGURES 4-6 and 9, there is no necessity for employing a protective coating on the test specimens, since they are sealed within the annular space. The test specimens used herein may be any shape, that is ribbon-like or in the shape of rods. The test specimens have substantially the same resistivity, which means they will have substantially the same chemical composition. Although advantages accrue in constructing the test specimens from materials having the same resistance values, suitable unsymmetrical corrosion testing elements can be fashioned in which the resistances of these elements are not identical, provided, for the sake of consistency, a material of construction is employed which is substantially uniform in composition and resistivity. In general, the ratio of the resistance of the unprotected test specimen to the resistance of the protected test specimen, expressed as $$\frac{R \text{ unprotected}}{R \text{ protected}}$$

may vary from values of about 0.1 to 10. Although the values of these ratios of resistances may vary over wide limits, it is well known to those skilled in this art that as a practical matter there are numerous chemical and electrical factors which have to be taken into consideration in the design of a suitable corrosion-test probe. These factors include lead resistance, the size of the assembly, and the factor of temperature compensation. Accordingly, by using test specimens which have substantially the same resistivity, the corrosion-test probe will function accurately when connected with the bridge-measuring circuit without the necessity of tedious calibration.

The various electrical contacts, such as 17, 18, 21, 45, 85, 87, 91, 96, 112, 113, 152, 156, 172, 174, are made by the use of copper or silver. In general, the parts may be machined from materials of construction which are designed for use at relatively high pressures and temperatures. For this purpose care should be exercised in the selection of materials for the basic parts of the test probe. The surfaces which contact the O rings and other sealing members should be relatively smooth so that an adequate seal is obtained when the apparatus is assembled. The thread and gasket-sealing surfaces may be coated with a sealing compound to insure against leaks.

From this description it is apparent that the invention is necessarily confined to the use of test specimens which have the property of conducting electricity and show a change in resistance which is proportional to changes in cross-sectional area due to corrosion. The materials of construction that meet these requirements include all metal and metal alloys, such as steel, iron, bronze, brass, copper, and the like. The environment to be investigated by the test elements or the completed test probes of this invention may be in any physical state or may exist as a mixture of substances in different physical states. The corrosive environment may be gaseous, vaporous, solid, or semi-solid, or a mixture of these forms of matter. Examples include corrosive gases, such as the halogens, acid or base solutions, flue gases, and mixtures of gases or carrier liquids containing a high content of solids, such as catalyst particles. These environments may be considered to be corrosive either because of their mechanical or chemical effects or combinations of same which result in loss of portions of the exposed test specimen. An example of a corrosive liquid environment would be an acid solution or an ammonia-ammonium nitrate fertilizer solution.

What is claimed is:

1. A corrosion-test probe comprising in combination a first test specimen and a second protected test specimen, said test specimens being fabricated of an electrical conductive, corrodible material and joined at adjacent ends to a common juncture, a common electrical lead connected to said common juncture, and a dissimilar metal lead connected to said common lead at a point intermediate the ends thereof to form a thermocouple, said point lying adjacent to one of said specimens, and electrical leads connected to the other ends of said test specimens.

2. A corrosion-test apparatus comprising a base member, a first test specimen and a second protected test specimen attached to and extending from said base member, said specimens being fabricated of an electrically conductive, corrodible material, the extended termini of said test specimens being joined in a common juncture, a common electrical lead connected to said common juncture, a second metal lead connected to said common lead at a point intermediate the ends thereof, said point lying adjacent to one of said specimens, said second metal lead being a different metal than said common lead to form a thermocouple therewith, an external circuit for measuring the ratio of the resistances of said specimens operably connected with said test specimens and said common lead, and external electrical means for indicating the temperature at said thermocouple operably connected with said common lead and said second lead.

3. A corrosion-test apparatus in accordance with claim 2 in which said first and second test specimens are attached to the outside of an elongated insulating member with their common juncture at one end thereof and said common lead and said second metal lead are embedded within said insulating member, and conductor means are attached to each of said test specimens and connected with said external circuit.

4. A corrosion-test apparatus in accordance with claim 2 in which said first and second test specimens are tubular, the former encompassing the latter, the adjacent ends at one end thereof are attached to a common closure, said common lead is connected to said closure, and said common electrical lead, and second metal lead extend within said second test specimen.

5. A corrosion-test probe adapted for use in comparative corrosion studies through an electrical bridge circuit comprising an electrically non-conducting specimen holder having a base end and an elongated body portion, a thin metalic-strip test specimen attached to and extending longitudinally on the outer surface of said specimen holder, an intermediate junction on said test specimen dividing same into two portions having substantially identical thickness, electrical resistance and composition, a protective coating over the surface of one of said portions of said test specimen to protect same from corrosion, four spaced electrical conductors embedded in insulated relationship within the body of said specimen holder and protruding from the base end thereof, a first conductor being connected to said intermediate junction, conductors connected to each of the ends of said test specimen, the fourth conductor being connected to an intermediate point on said first conductor, and said first and fourth conductors being of dissimilar metals to form a thermocouple.

6. A corrosion-testing probe comprising in combination a tubular test specimen having an enclosed end and an open end, a protected test specimen encompassed by said tubular test specimen in spaced relation therewith and attached to said enclosed end, said test specimens being fabricated of an electrically conductive, corrodible material, electrical conducting means attached to each of said test specimens at a point removed from said enclosed end, an electrical conductor encompassed by said tubular test specimen connected to said enclosed end, and another conductor of dissimilar material connected to said encompassed conductor to form a thermocouple therewith.

7. A metal corrosion-test element for simultaneous detection of corrosion and temperature of a corrosive environment comprising a tubular specimen, a second tubular test specimen within and spaced from said first tubular test specimen, an end-plate attached to and sealed across the ends of said tubular test specimens, a common lead attached to said end-plate and spaced from said test specimens, a second lead attached to an intermediate point on said common lead, said second lead being of a dissimilar metal from said common lead to form a thermo-electric juncture at said intermediate point, said end-plate being of such size in relation to the size of said test specimens as to offer negligible electrical resistance and substantially no change in resistance upon corrosion of its outer surface, and separate leads attached to the open ends of said test specimens.

8. A corrosion-test probe comprising an insulating base member, four spaced apertures through said base member extending between opposite sides thereof, four self-supporting rigid leads extending in pressure-sealed relationship through said apertures, said leads terminating at different distances from said base member on one side thereof, a first test specimen attached between the ends of a first lead and a second lead, a second test specimen attached between the end of said first lead and a third lead, said test specimens being fabricated of an electrically conductive, corrodible material said fourth lead attaching to an intermediate point on said first lead between said end thereof and said aperture through which the first lead passes and being composed of a metal dissimilar to that of said first lead to form a thermocouple therewith, and one of said test specimens being protected from corrosion by a corrosion-resistant coating.

9. A corrosion-test probe comprising an internal insulating base means supporting a conductor rod, a cap means attached to one end of said rod to present an annular continuous sealing surface toward said base means, said base means having a corresponding annular, continuous sealing surface toward the sealing surface of said cap means, a conductive plug within said cap means and engaging one end of said rod, an insulating sleeve means encompassing and spaced from said base means and having terminal, annular, continuous, sealing surfaces opposite the sealing surfaces of said base means and said cap means, resilient annular seal rings between said opposed sealing surfaces, a pair of elongated test specimens fabricated of an electrically conductive, corrodible material and mounted longitudinally by said base means, each of said test specimens having their contiguous ends held by said sealing surfaces and said annular seals by means of said cap means, one of said test specimens having its body portion outside said base and said sleeve means, the other of said test specimens having its body portion within the annular space between said sleeve means and said base means, one pair of contiguous ends of said test specimens being maintained in electrical contact with said conductor rod forming a common lead therefrom, an aperture within said base means leading to an intermediate point on said conductor rod, a first electrical lead within said aperture and attached to said intermediate point thereon, said first electrical lead being of a dissimilar metal from said conductor rod to form a thermo-electric juncture at said intermediate point, and leads attaching to said test specimens.

10. A corrosion-test apparatus for simultaneously measuring the rate of corrosion and temperature of a corrosive atmosphere comprising, in combination, a pair of matched test specimens extending from and supported by a base member in insulated relationship therewith, said test specimens being fabricated of an electrically conductive, corrodible material and joined at their extended ends to a common juncture, a common lead extending from said juncture through said base member in insulated relationship therewith, a second lead connected to said common lead at an intermediate point thereon, said second lead being of a metal dissimilar to said common lead to form a thermo-electric juncture at said intermediate point, and means connected to said test specimens and said leads to detect the rate of change of electrical resistance with cross-sectional area of the former, and detect the amount of thermo-electric current generated by said juncture due to the heat content of said corrosive atmosphere.

References Cited in the file of this patent

UNITED STATES PATENTS

| | | |
|---|---|---|
| 2,505,936 | Behn | May 2, 1950 |
| 2,735,754 | Dravnieks | Feb. 21, 1956 |
| 2,824,283 | Ellison | Feb. 18, 1958 |

OTHER REFERENCES

Stormont: "Corrosion Rates Directly Measured by New Resistance Method," Oil and Gas Journal, Jan. 21, 1957.

"Symposium on the Corrosion of Metals," Journal of Scientific Instruments, volume 22:12, December 1945.